US008489411B1

(12) United States Patent
Rowe, III et al.

(10) Patent No.: US 8,489,411 B1
(45) Date of Patent: Jul. 16, 2013

(54) SYSTEMS AND METHODS FOR AUDITING FEE CALCULATIONS ASSOCIATED WITH CLAIM REIMBURSEMENT FROM PHARMACY BENEFIT MANAGEMENT SERVICES

(75) Inventors: James Couser Rowe, III, Sugar Hill, GA (US); Michael Alan Urich, Suwanee, GA (US)

(73) Assignee: NDCHealth Corporation, Atlanta, GA (US)

( * ) Notice: Subject to any disclaimer, the term of this patent is extended or adjusted under 35 U.S.C. 154(b) by 844 days.

(21) Appl. No.: 11/759,767

(22) Filed: Jun. 7, 2007

Related U.S. Application Data (60) Provisional application No. 60/811,688, filed on Jun. 7, 2006.

(51) Int. Cl.
*G06Q 10/00* (2012.01)
*G06Q 40/00* (2012.01)

(52) U.S. Cl.
USPC ................................................ 705/2; 705/35

(58) Field of Classification Search
USPC ...................................................... 705/2, 35
See application file for complete search history.

(56) References Cited

U.S. PATENT DOCUMENTS

| | | | |
|---|---|---|---|
| 5,628,530 A | 5/1997 | Thornton | |
| 6,012,035 A | 1/2000 | Freeman et al. | |
| 6,195,612 B1* | 2/2001 | Pack-Harris | 702/2 |
| 6,757,898 B1 | 6/2004 | Ilsen et al. | |
| 6,769,228 B1 | 8/2004 | Mahar | |
| 7,155,397 B2 | 12/2006 | Alexander et al. | |
| 7,401,027 B2* | 7/2008 | Moore et al. | 705/2 |
| 7,797,172 B2 | 9/2010 | Fitzgerald et al. | |
| 8,244,556 B1 | 8/2012 | Ringold | |
| 2001/0037216 A1* | 11/2001 | Oscar et al. | 705/2 |
| 2002/0002495 A1 | 1/2002 | Ullman | |
| 2002/0087583 A1 | 7/2002 | Morgan et al. | |
| 2002/0111832 A1 | 8/2002 | Judge | |

(Continued)

FOREIGN PATENT DOCUMENTS

| | | |
|---|---|---|
| CA | 2482370 A1 | 3/2006 |
| WO | WO9503569 A3 | 2/1995 |
| WO | WO0039737 A1 | 7/2000 |
| WO | WO2007025295 A2 | 3/2007 |

OTHER PUBLICATIONS

Laury, Susan K; McInnes, Melayne Morgan; "The impact of insurance prices on decision making biases: An experimental analysis"; Jun. 2003; Journal of Risk & Insurance; v70n2 pp. 219; ISSN: 0022-4367.*

(Continued)

*Primary Examiner* — Edward Chang
(74) *Attorney, Agent, or Firm* — Sutherland Asbill & Brennan LLP (57) ABSTRACT

Systems and methods for auditing claim reimbursement transactions to ensure that pharmacy benefit management services (PBMs) are properly calculating the appropriate spread values and honoring existing contractual obligations with health plans and/or employer groups. When a discrepancy has been detected and is larger than preset tolerance parameters allow, the adjudicated claim will be sent to the corresponding PBM for explanation of the discrepancy and/or corrective action. Example embodiments of the auditing process may analyze transaction data in batch form, or in alternative embodiments of the invention, the adjudicated reimbursement claim transactions may be audited in real-time or near real-time.

20 Claims, 3 Drawing Sheets

U.S. PATENT DOCUMENTS

| | | |
|---|---|---|
| 2002/0188476 A1 | 12/2002 | Bienvenu |
| 2002/0198831 A1 | 12/2002 | Patricelli et al. |
| 2003/0009367 A1 | 1/2003 | Morrison |
| 2003/0050799 A1 | 3/2003 | Jay et al. |
| 2003/0069760 A1 | 4/2003 | Gelber |
| 2003/0083903 A1 | 5/2003 | Myers |
| 2003/0149625 A1 | 8/2003 | Leonardi et al. |
| 2003/0154163 A1 | 8/2003 | Phillips et al. |
| 2003/0229540 A1 | 12/2003 | Algiene |
| 2004/0006490 A1* | 1/2004 | Gingrich et al. ............ 705/2 |
| 2004/0039599 A1 | 2/2004 | Fralic |
| 2004/0054685 A1 | 3/2004 | Rahn et al. |
| 2004/0073457 A1 | 4/2004 | Kalies |
| 2004/0078234 A1* | 4/2004 | Tallal, Jr. ............... 705/2 |
| 2004/0117323 A1 | 6/2004 | Mindala |
| 2004/0148198 A1 | 7/2004 | Kalies |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0102169 A1 | 5/2005 | Wilson |
| 2005/0137912 A1 | 6/2005 | Rao et al. |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240473 A1 | 10/2005 | Ayers, Jr. et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0085230 A1* | 4/2006 | Brill et al. ............. 705/4 |
| 2006/0149784 A1 | 7/2006 | Tholl et al. |
| 2006/0184391 A1 | 8/2006 | Barre et al. |
| 2006/0212318 A1 | 9/2006 | Dooley et al. |
| 2006/0217824 A1 | 9/2006 | Allmon et al. |
| 2006/0259363 A1 | 11/2006 | Jhetam et al. |
| 2007/0005402 A1 | 1/2007 | Kennedy et al. |
| 2007/0050209 A1 | 3/2007 | Yered |
| 2007/0136100 A1 | 6/2007 | Daugherty et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |

OTHER PUBLICATIONS

Irvine, Benedict; "Health care superieur: Does the UK need French lessons"; May/Jun. 2001; Consumer Policy Review vl 1 n3 pp. 92-100; Journal Code: CPW.*

Knight-Ridder Tribune Business News; "Milwaukee-Area Businesses Initiate Plan to Cut Health Costs"; Sep. 2, 2003; Supplier No. 107223132.*

Sampson, R.J., Taking Control of Health Care Costs, Best's Review—Life Health Insurance Edition, Nov. 1983, pp. 64-66, vol. 84, Issue 7, USA.

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

Lamb, J., New Era of Electronic Medicine Management: E-Prescriptions, Britain's Traditionally Cautious National Health Service is Starting Trials for Online Prescription, with the Aim of Cutting Costs. Financial Times, London, Feb. 21, 2001, p. 6, London, United Kingdom.

Anonymous, Pharmacy Industry Leaders Launch Firm to Supply Real-Time Data. PR Newswire. Jul. 30, 2001, p. 1, New York, NY, USA.

Anonymous, Medic; On-line Goes In-House, Chain Store Age Executive, Jan. 1987, pp. 128-132. vol. 63, Issue 1, USA.

Anonymous, TechRx Announces Successful Beta Deployment of T-Rex. PR Newswire. May 13, 2002.

Navitus, "Pharmacy Adjudication Alternative to WAP" Pharmacy Benefits Academy, Aug. 19, 2010.

ViewPoints, "AWP Litigation Means Rapid Change Ahead" Nov./Dec. 2008.

State of Mississippi, Division of Medicaid, Provider Policy Manual May 12, 2008.

Paduda, Joseph, "Managed Care Matters" from comments, 2006.

Pennsylvania Department of Aging, "Acquisition Cost-Based Pricing for the PACE Program" Feb. 10, 2009.

Non-Final Office Action mailed Apr. 6, 2011 for related U.S. Appl. No. 12/415,134, filed Mar. 31, 2009.

Non-final Office Action for U.S. Appl. 12/327,100 mailed May 11, 2011.

Final Office Action for U.S. Appl. 12/327,100 mailed Oct. 17, 2011.

Non-final Office Action for U.S. Appl. 12/731,269 mailed Jan. 13, 2012.

Non-final Office Action for U.S. Appl. 12/731,269 mailed Oct. 19, 2012.

Final Office Action for U.S. Appl. No. 12/731,269 mailed Jun. 19, 2012.

Final Office Action for U.S. Appl. No. 12/731,269 mailed Mar. 15, 2013.

* cited by examiner

SYSTEMS AND METHODS FOR AUDITING FEE CALCULATIONS ASSOCIATED WITH CLAIM REIMBURSEMENT FROM PHARMACY BENEFIT MANAGEMENT SERVICES

CROSS-REFERENCE TO RELATED APPLICATION

This application claims the benefit of priority to U.S. Provisional Patent Application Ser. No. 60/811,688 entitled, "Systems and Methods for Auditing the Spread Values Associated with Claim Reimbursement," which was filed in the United States Patent and Trademark Office on Jun. 7, 2006, which is hereby incorporated by reference.

FIELD OF THE INVENTION

This invention relates to the processing and reimbursement of insurance claims. More specifically, it relates to the monitoring and auditing of reimbursed prescription claims in the pharmaceutical industry.

BACKGROUND OF THE INVENTION

Companies providing pharmacy benefit management services, known as "PBMs," provide prescription drug program administration to health plans and/or employer groups. As part of the processing agreement with the health plan providers and/or employer groups, PBMs charge a percentage fee in excess of the cost reimbursed to the dispenser of the prescription item. This fee, often referred to as a "spread," is typically a single digit percentage in the range of 2%-4%.

It is a concern of health plan providers, employer groups, as well as PBMs themselves that some PBMs may not be calculating the spread value correctly. Some PBMs may even manipulate the reimbursement data to ensure that the calculation of spread values results in larger spread values than otherwise should be paid under the contractual arrangement. For instance, it is believed that one technique used to maximize the spread value involves delaying the use of price updates used in pharmacy reimbursement calculations while using an updated price (which is higher than the previous price) in spread calculations, thereby increasing the spread value beyond the contractual arrangement.

SUMMARY OF THE INVENTION

The invention relates to systems and methods for auditing claim reimbursement transactions to ensure that payer systems or pharmacy benefit management services (PBMs) are properly calculating the appropriate spread values and honoring existing contractual obligations with health plans and/or employer groups. According to an embodiment of the invention, there is disclosed a method of electronically auditing reimbursed prescription claims, and a systems for implementing that method. The method includes receiving an adjudicated claim at a host server or computer, where the adjudicated claim was previously adjudicated by a PBM or payer system.

The method further includes determining an actual spread percentage (or monetary value) charged by the payer system and determining an expected spread percentage (or monetary value) associated with the adjudicated claim. The determination may be retrieving the actual spread percentage (or monetary value) and/or the expected spread percentage (or monetary value) from a database. Alternatively, the determination may be calculating either or both of the actual spread percentage (or monetary value) and expected spread percentage (or monetary value) utilizing available information including a cost associated with the adjudicated claim, prescription information from the adjudicated claim (e.g., a drug name, a quantity, and a date a prescription was filled, etc.), and/or policy data associated with the adjudicated claim as well as associated with the PBM (or specific payer system) that adjudicated the claim.

The method further includes comparing the actual spread percentage to the expected spread percentage to determine a difference value and detecting that the difference value is unacceptable based on a comparison of the difference value to at least one adjustable tolerance parameter. The method also includes storing an indication that the discrepancy existed and/or stores the difference value itself in a database.

In accordance with one aspect of the invention, the method may include receiving at least one exception comment from the payer system relating to the difference value, and transmitting a message containing the exception comment(s) and information relating to the adjudicated claim as well as the difference value. According to another aspect of the invention, the adjudicated claim may be retrieved from a spread evaluation table in a database.

When determining the actual spread percentage charged by the payer system a current Average Wholesale Price (AWP) value (or other drug pricing measurement) of at least one drug associated with the adjudicated transaction may be utilized. In addition, a user may access the tolerance parameter(s) through a user interface and adjust their values to, among other things, adjust the sensitivity of the detection of a discrepancy between the actual spread value and the expected spread value.

The audit service described in the example methods and systems described in detail herein, may be conducted as a one time "spot check" service, or an ongoing service based on a specified reporting period. Example embodiments of the invention may audit transactions retrospectively by auditing past transactions. Such embodiments may analyze transaction data in batch form, or alternatively, the reimbursed claim transactions may be audited in real-time or near real-time.

BRIEF DESCRIPTION OF THE FIGURES

Reference will now be made to the accompanying drawings, which are not necessarily drawn to scale, and wherein.

DETAILED DESCRIPTION OF THE INVENTION

The invention described herein relates to systems and methods for auditing claim reimbursement transactions to ensure that payer systems or pharmacy benefit management services (PBMs) are properly calculating the appropriate spread values and honoring existing contractual obligations with health plans and/or employer groups related to the spread percentage fee. Example embodiments of the invention may audit previously adjudicated claim transactions retrospectively. Such an embodiment may analyze transaction data in batch form, or in alternative embodiments of the invention, the reimbursed claim transactions may be audited in real-time or near real-time following adjudication of the claim by a PBM or payer system. For the purposes of the description of example embodiments of the invention contained herein, the term PBM may refer to an individual payer system or represent a group of payer systems.

The invention now will be described more fully hereinafter with reference to the accompanying drawings, in which example embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The example embodiments of the invention are described below with reference to block diagrams and flowchart illustrations of systems, methods, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
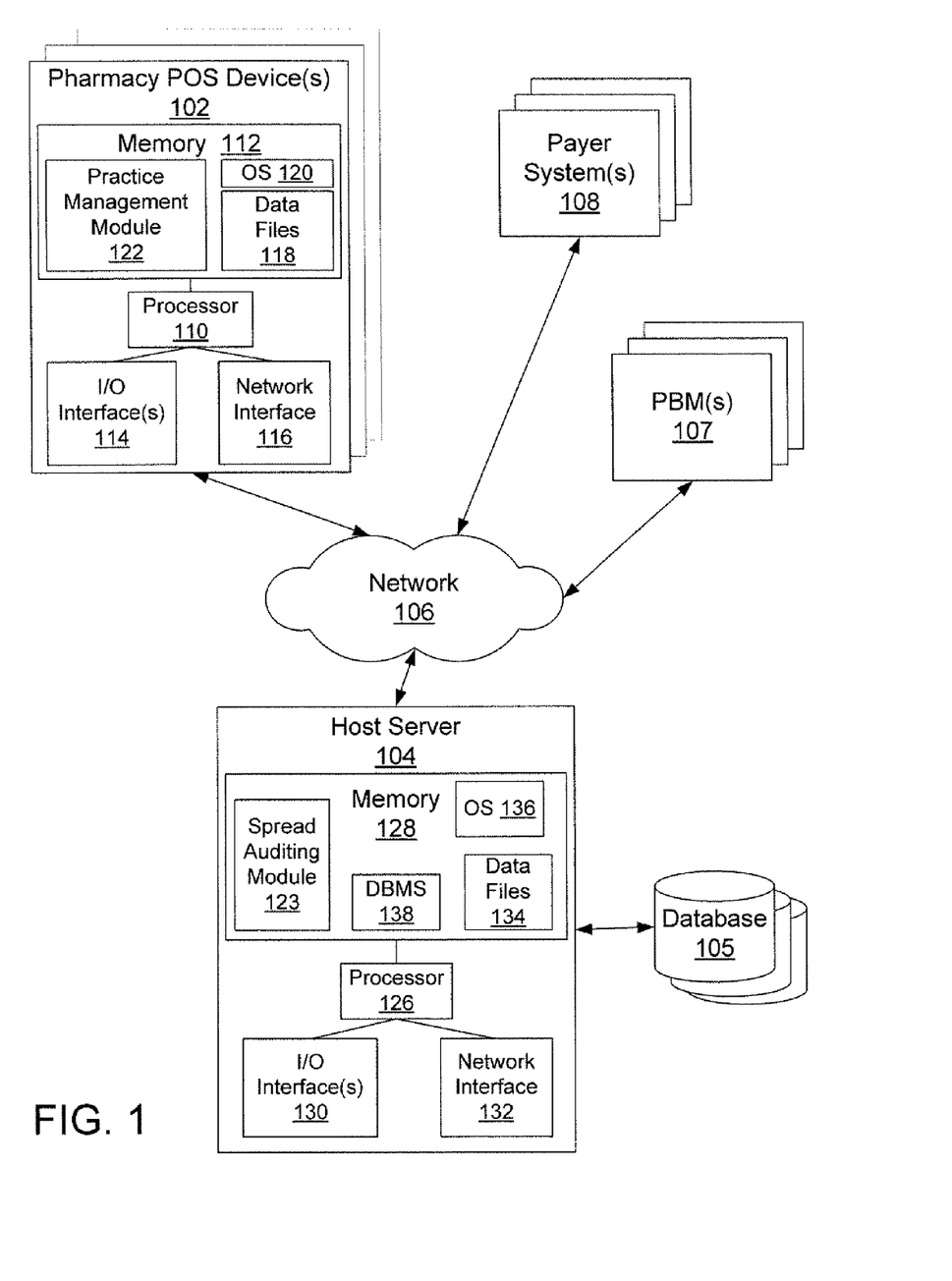
FIG. 1 shows a claim processing and auditing system in accordance with an example embodiment of the invention.

Example embodiments of the invention will hereinafter be described with reference to the figures, in which like numerals indicate like elements throughout the several drawings. FIG. 1 shows a claim processing and auditing system in accordance with an example embodiment of the invention. In particular, FIG. 1 is an example operating environment for implementation of certain embodiments of the invention. As shown in FIG. 1, a pharmacy point-of-service ("POS") device(s) 102 is in communication with a host server 104, which is, in turn, in communication with a pharmacy benefit management service(s) or "PBM(s)" 107 or directly in communication with a health plan provider and/or employer group, collectively referred to as "payer systems" 108.

The pharmacy POS device(s) 102, host sever 104, PBM(s) 107, and payer systems 108 are each configured for accessing and reading associated computer-readable media having stored thereon data and/or computer-executable instructions for implementing the various methods of the invention. Generally, network devices and systems include hardware and/or software for transmitting and receiving data and/or computer-executable instructions over a communications link and a memory for storing data and/or computer-executable instructions. Network devices and systems may also include a processor for processing data and executing computer-executable instructions, as well as other internal and peripheral components that are well known in the art. As used herein, the term "computer-readable medium" describes any form of memory or a propagated signal transmission medium. Propagated signals representing data and computer-executable instructions are transferred between network devices and systems.

As shown in FIG. 1, a pharmacy POS device 102 may be in communication with the host server 104 via a network 106. The pharmacy POS device 102 may be configured for receiving prescription claim data, creating claim reimbursement transactions therefrom and transmitting said claim reimbursement transactions to the host server 104. Prescription claim data includes any data that is typically provided by a patient, pharmacist and/or other health care provider in relation to filling a prescription (e.g., cost associated with filling the prescription, etc.) and/or requesting approval or authorization for payment from a claim adjudicator such as a payer system 108 or PBM 107. A payer may be an insurance company, a financial institution or another financial service provider. Prescription claim data may be input to the pharmacy POS device 102 by a pharmacist or other health care provider or may be received by the pharmacy POS device 102 in electronic form from an electronic prescription service (not shown). The pharmacy POS device 102 may be configured for handling other types of prescription transactions.

Prescription claim transactions are electronic records or messages intended to facilitate the communication of prescription information. For example, prescription claim transactions are intended to communicate prescription claim data between pharmacies (i.e., providers) and payers. Although prescription claim transactions (also referred to herein as reimbursement claim transactions) will be discussed hereinafter, it should be understood that the various systems and method of the invention may be practiced in connection with other types of prescription transactions or independently of prescription transactions (e.g., raw prescription data). The content and format of a prescription claim may vary depending on which standard or protocol is used. In general, however, prescription claim transactions will identify the intended payer recipient, the drug product to be dispensed or previously dispensed, e.g., by National Drug Code number ("NDC"), the quantity to be dispensed as well as the days supply, whether the prescription claim relates to a new prescription or a refill prescription, and billing-related information.

Prescription claim transactions may be transmitted from the pharmacy POS device 102 to the host server 104 in batch, real-time or near real-time. Pharmacy POS devices can connect to the host server 104 through a variety of methods, including dial-up, frame relay or leased-line. The entire system may be supported by redundant software, communications links, and uninterruptible power supplies, thereby ensuring that all connections will provide reliable, continuous operation. The system may also ensure that all of provider-submitted claims transactions are routed quickly, accurately, and consistently. The claim processing system substantially reducing the costs of submitting claims and speeding up providers' payment cycles.

Using the claim processing system, providers can transmit, in real-time, provider-submitted claims to an appropriate payer and return a claim approval or rejection within seconds. Thus, the claim processing system can streamline provider claim processing operations and increase productivity for both providers and benefit plans. To enable the provider to input claims for electronic transmission to the claim processing system and payer, the pharmacy POS device 102 may comprise software that receives claim data entered by a user through a graphical user interface (GUI). In one example embodiment, no claim processing software resides on the pharmacy POS device 102, other than an Internet browser, because the GUI and one or more interfaces for inputting claim data are stored by the claim processing system and remotely accessible by the pharmacy POS device 102 via an Internet connection, satellite or cellular network, LAN, WAN, or the like. Using the GUI information such as a patient's name, birth date, address, telephone number and other identifying information is entered with claim-specific information, such as drug prescription or medical service or procedure. The identity of the pharmacy is also included in the claim data along with additional information known to those of ordinary skill in the art.

The claim data fields may be defined by a particular payer such that the pharmacy POS device 102 should provide only the claim data requested by the payer to which the claim is transmitted. The claim data may also be defined by a pre-established standard or transaction format well known to those of skill in the art. Once the claim is entered, it is transmitted to the host server 104 via any of the methods described above. The claim is then edited by the host server 104 and/or forwarded by the host server 104 to the appropriate pharmacy benefit management service (PBM) 107 and/or payer system 108. In an example embodiment, the claim processing system, and more particularly, the host server 104, is an all-payer solution allowing providers to use a single application to connect to key government and commercial PBMs 107 and/or payer systems 108 across the country.

In certain embodiments, the host server 104 may serve as a clearinghouse for multiple PBMs 107 and/or payer systems 108. As noted above, payer systems 108 may include systems operated by insurance companies, financial institutions and other financial service providers. In its capacity as a clearinghouse, the host server 104 is operable to parse prescription claim transactions and forward them to the appropriate PBM 107 and/or payer system 108 for processing. Approval, authorization or rejection messages may be returned to the host server 104 from the PBM 107 and/or payer system 108 and such messages may be forwarded by the host server 104 to the pharmacy POS device 102.

In serving as a clearinghouse, the host server 104 may also be configured for performing pre-editing and post-editing of prescription claim transactions. Pre-editing and post-editing refers to validation and management of prescription claim data in order to maximize prescription claim reimbursement and minimize claim submission errors. Pre-editing and post-editing may generate messaging alerts and/or retrospective reports supporting "usual and customary" price comparisons, price edits such as average wholesale price ("AWP") edits, dispense as written ("DAW"), brand appropriateness, and numerous other screening processes for facilitating rapid and accurate validation of prescription claims.

In accordance with an example embodiment of the invention, the host server 104, and more particularly, the spread auditing module 123, may be configured for performing certain adjudicated claim screening, reporting, and editing processes for the detection and correction of a spread value(s) associated with an adjudicated claim reimbursement transaction. The host server 104 intercepts claims adjudicated by a PBM 107 and/or payer system 108, and the spread auditing module 123 parses and examines the claim's contents. The spread auditing module 123 may comprise computer-executable instructions for performing various processes for reviewing, storing and possibly editing reimbursement claims, as well as managing related messaging and reporting functions regarding information used during the adjudication of a claim by a PBM 107 and/or payer system 108 (e.g., AWP values, etc.). An example embodiment of the process conducted by the spread auditing module 123 in accordance with the invention is described in further detail below with reference to FIG. 2.

The spread auditing module 123 may determine if the claim contains the appropriate spread value based on the contractual obligations of the adjudicator (e.g., the PBM 107 and/or the payer system 108). If it is determined that the adjudicated claim does have the appropriate spread value then such a detection is noted and the transaction is logged and/or indicated to the pharmacy submitting the reimbursement claim. If the adjudicated claim does not have the appropriate spread value then that adjudicated claim is flagged indicating that further explanation by the adjudicating body is required, and the claim is logged and reported to the responsible adjudicating body for response (e.g., explanation and/or corrective action) and/or reported to a third party (e.g., a payer system that the adjudicating PBM represents, the pharmacy that submitted the reimbursement claim, etc.). The audited results may also be made available via a user interface such as through a web browser with a password log-in for security and/or confidentiality purposes.

Further, in an example embodiment of the invention, the audits may be conducted in batch format and a report may be generated with analysis on one or more adjudicated claims. In a batch mode, the auditing process conducted by the spread auditing module 123 may be done retrospectively on previous adjudicated claims that are stored in a database. The auditing process of example embodiments of the invention may be conducted periodically or as requested. In alternative embodiments of the invention, the auditing process may occur for each transaction in real-time or near real-time upon receipt of the adjudicated claim by the spread auditing module 123.

In an example embodiment of the invention, the PBM 107 and/or payer system 108 has the ability to provide explanation for the detected exceptions to the contracted rates detected by the spread auditing module 123. In an example embodiment of the invention, the explanations may be entered through a graphical user interface hosted by the host server 104 or other data center and accessible "online" via a web browser. The spread auditing process and the exception logging/reporting will be discussed in further detail below with reference to FIGS. 2-3.

Referring again to FIG. 1, it will be appreciated that the pharmacy POS device 102 may be any processor-driven device, such as a personal computer, laptop computer, handheld computer and the like. In addition to a processor 110, the pharmacy POS device 102 may further include a memory 112, input/output ("I/O") interface(s) 114 and a network interface 116. The memory 112 may store data files 118 and various program modules, such as an operating system ("OS") 120 and a practice management module 122. The practice management module 122 may comprise computer-executable instructions for performing various routines, such as those for creating and submitting prescription claim transactions. I/O interface(s) 114 facilitate communication between the processor 110 and various I/O devices, such as a keyboard, mouse, printer, microphone, speaker, monitor, etc. The network interface 116 may take any of a number of forms, such as a network interface card, a modem, etc. These and other components of the pharmacy POS device 102 will be apparent to those of ordinary skill in the art and are therefore not discussed in more detail herein.

Similarly, the host server 104 may be any processor-driven device that is configured for receiving and fulfilling requests related to prescription claim transactions. The host server 104 may therefore include a processor 126, a memory 128, input/output ("I/O") interface(s) 130 and a network interface 132. The memory 128 may store data files 134 and various program modules, such as an operating system ("OS") 136, a database management system ("DBMS") 138 and the spread auditing module 123. The host server 104 may include additional program modules (not shown) for performing other pre-editing or post-editing methods and for providing clearinghouse services. Those skilled in the art will appreciate that the host server 104 may include alternate and/or additional components, hardware or software. In addition, the host server 104 may be connected to a local or wide area network (not shown) that includes other devices, such as routers, firewalls, gateways, etc.

The host server 104 may include or be in communication with one or more database 105. The database 105 may store, for example, data relating to pharmacies, payers, state prescription laws, prescription drugs, formularies, adjudicated claims, and consumers, such as typical doses filled by consumers, typical drugs prescribed by doctors, most common daily dose values, common daily dose values, likelihood indicators and other data used in the various claim screening and editing processes described herein after. The database 105 may also store reports and other data relating to the results of the claim screening and edit processes. The database 105 may of course also store any other data used or generated by the host server 104 or spread auditing module 123, such as data used in auditing processes and reports generated thereby. Although a single database 105 is referred to herein for simplicity, those skilled in the art will appreciate that multiple physical and/or logical databases may be used to store the above mentioned data. For security, the host server 104 may have a dedicated connection to the database 105, as shown. However, the host server 104 may also communicate with the database 105 via a network 106.

The network 106 may comprise any telecommunication and/or data network, whether public or private, such as a local area network, a wide area network, an intranet, an Internet and/or any combination thereof and may be wired and/or wireless. Due to network connectivity, various methodologies as described herein may be practiced in the context of distributed computing environments. Although the example pharmacy POS device 102 is shown for simplicity as being in communication with the host server 104 via one intervening network 106, it is to be understood that any other network configuration is possible. For example, the pharmacy POS device 102 may be connected to a pharmacy's local or wide area network, which may include other devices, such as gateways and routers, for interfacing with another public or private network 106. Instead of or in addition to a network 106, dedicated communication links may be used to connect the various devices of the system. Various encryption method appreciable by one of ordinary skill in the art may be utilized to enable secure communication on an otherwise unsecured network.

Those skilled in the art will appreciate that the operating environment shown in and described with respect to FIG. 1 is provided by way of example only. Numerous other operating environments, system architectures and device configurations are possible. For example, the invention may in certain embodiments be implemented in a non-networked environment, in which a stand-alone pharmacy POS device 102 executes one or more spread auditing module(s) 123. Accordingly, the invention should not be construed as being limited to any particular operating environment, system architecture or device configuration.

Figure 2:
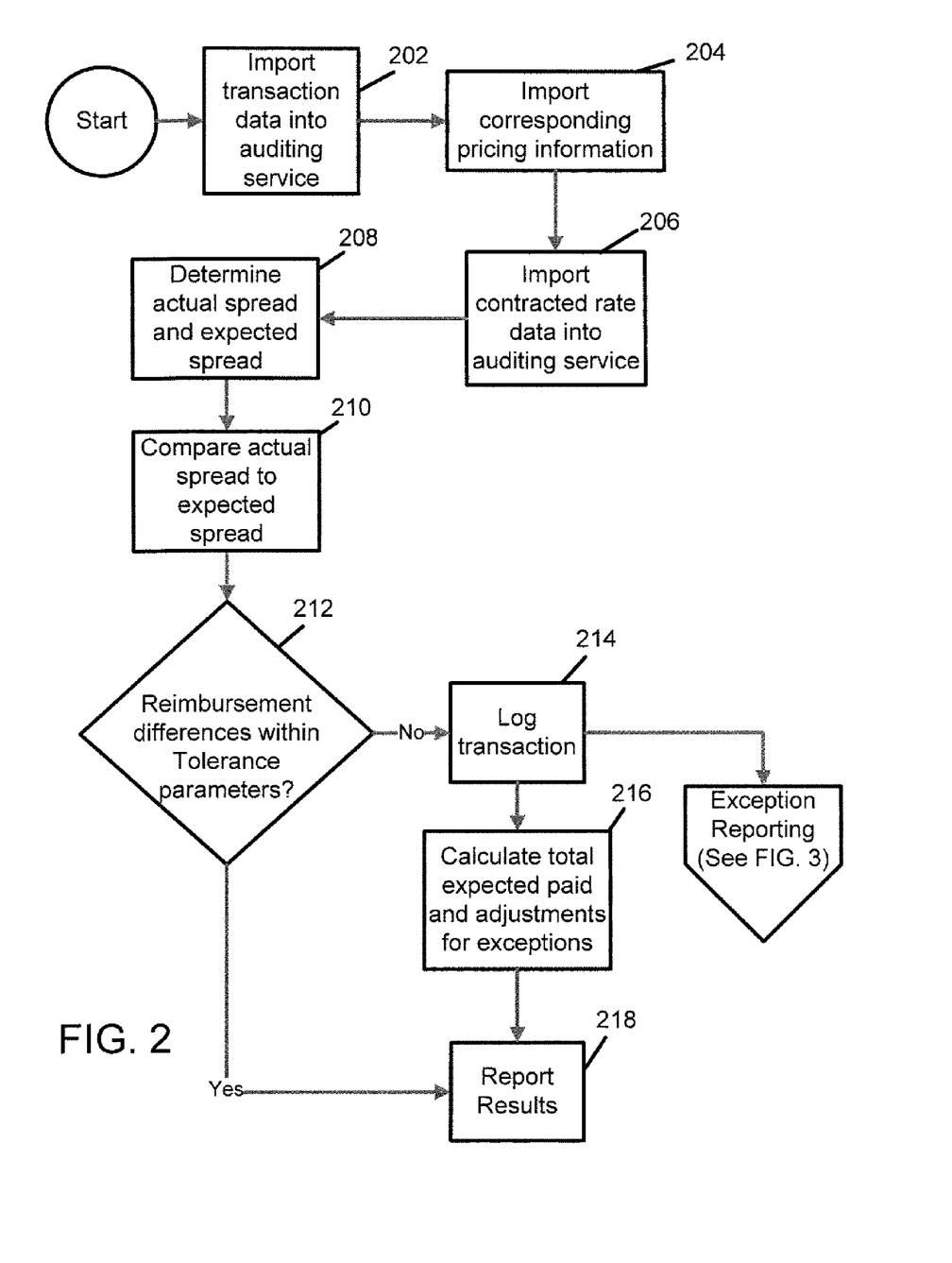
FIG. 2 shows a block diagram flowchart showing the process of monitoring and auditing the reimbursed claim in accordance with an example embodiment of the invention.

FIG. 2 shows a block diagram flowchart showing the process of monitoring and auditing the reimbursed claim in accordance with an example embodiment of the invention. As shown in the example embodiment of FIG. 2, the process starts at step 202 where an adjudicated claim previously received at a host server and stored in a database associated with the host server is retrieved (or imported) to undergo the spread auditing process. In an example embodiment of the invention, a customer's (e.g., pharmacy) initial reimbursement claim(s), having been adjudicated by a PBM (e.g., insurance processor or group of insurance processors), and may be stored (or identified) in a spread evaluation table located in one or more databases associated with the spread auditing module. In an alternative embodiment of the invention, rather than being retrieved from a database, an adjudicated claim may undergo the auditing process in real-time or near real-time once received at the host server.

At the host server, the spread auditing module may parse the relevant data to be utilized in the auditing process. For example, the prescription information (e.g., drug name, quantity, date fulfilled, etc.) may be extracted from the previously adjudicated claim. The specific amount (or cost) reimbursed by the PBM for that particular transaction may also be extracted from the adjudicated claim.

Next, step 204 may be invoked where pricing information may also be accessed such as the average wholesale price (AWP) associated with the drug(s) of the adjudicated transaction. Further, in an example embodiment of the invention, an inquiry may be made in step 204 to determine if there has been a recent price change to a manufacturer set price such as an AWP price change (e.g., typically the change in the manufacturer set price is a price increase), such a price change may be taken into account when calculating the spread percentage (or specific spread monetary value) associated with the particular adjudicated transaction charged by the PBM that adjudicated the claim on behalf of one or more payer systems.

The detection of the AWP price change (or "new" AWP) may occur in a variety of different ways. For instance, the system may receive updated AWP information on various drugs (or other items associated with a particular AWP) from manufacturers directly (as the manufacturers drive AWP price updates) or monitoring services. For example, the services of First Databank, Inc. may be utilized to monitor AWP price updates. The period of time considered to be a "recent" price change may be any set length of time, or may be as long as the AWP price change remains unrecognized by one or more payers. For all reimbursement claims where there is an AWP price change detected from the manufacturer or a monitoring service, etc., the reimbursement claim information is stored in a transaction table located in one or more databases associated with the spread auditing module. With such information from independent sources, calculation may be conducted on the information provided by the adjudicated reimbursement claim to determine the spread percentage (or specific spread monetary value) associated with the particular adjudicated claim charged by the PBM that adjudicated the claim on behalf of one or more payer systems.

Other methods of determining an AWP price update, including monitoring and evaluating similar claims for reimbursement from a particular payer over a period of time to determine when an AWP price update for that payer's adjudication system has occurred, are discussed in U.S. patent application Ser. No. 11/364,987, entitled "Systems and Methods for Pharmacy Reimbursement Claim Resubmission." Such addition methods of AWP determination are incorporated by reference as if fully stated herein.

In alternative embodiments of the invention, pricing information other than AWP may be accessed, monitored and/or determine similar to the process described above relating to the AWP. For example, the Average Manufacturer's Price (AMP), the Average Sales Price (ASP) and/or other price measurement standard(s) appreciable by one of ordinary skill in the art may be utilized.

Step 206 may be invoked to retrieve or import the contractual data (or policy data) that is relevant to the adjudicated claim. For example, the spread percentage that is to be used for that particular adjudicated claim based on the contractual obligations of the PBM may be retrieved from a database for use in the auditing process.

In step 208, the actual spread percentage (or monetary value) and the expected spread percentage (or monetary value) are determined. The actual spread percentage (or monetary value) is the spread value the PBM charged for the adjudicated claim(s). The expected spread percentage (or monetary value) is the spread value based on the contractual rate associated with the adjudicated claim, which is determined from the policy data associated with the PBM (or specific payer system).

In an example embodiment of the invention, the actual spread percentage (or monetary value) and/or the expected spread percentage (or monetary value) may be retrieved from a database, or alternatively, either or both of the actual spread percentage (or monetary value) and the expected spread percentage (or monetary value) may be calculated based on information contained in the adjudicated claim, AWP values associated with the adjudicated claim, policy data associated with the PBM or a specific payer system, etc. Such information used in calculation may be retrieved from one or more data storage locations including the spread evaluation table or other database location. Once the actual spread percentage (or monetary value) and the expected spread percentage (or monetary value) are determined (or identified), then step 210 is invoked where the actual spread percentage (or monetary value) compared to the expected spread percentage (or monetary value) to determine if an discrepancy exists between the two values.

In alternative embodiments of the invention, various other comparisons or calculations may be conducted to determine if the contractual obligated reimbursement was conducted. For example, the expected spread dollar value may be calculated and the compared to the actual spread dollar value paid. These and other methods for calculating the discrepancies between the actual spread rated charged and the contractual obligation may be appreciable by one of ordinary skill in the art.

Step 212 is invoked to compensate for minor discrepancies in how various system conduct their calculations of the actual and/or expected spread percentage (or monetary value). In step 212, tolerance parameters are utilized to determine how close the calculated actual spread percentage of the adjudicated claim is to the contractual rate. For example, the auditing module may set adjustable tolerance parameters to ignore a minor discrepancy between the actual spread percentage rate detected and the contractual spread percentage rate (e.g., ignore difference of less than +/−0.1%).

In an alternative embodiment of the invention, additional adjustable operating parameters may be adjustable through a user interface that may be accessible over a web browser and supported by the host server—to alter the amount of data audited, how often the auditing of the data occurs, which PBM's adjudicated transactions are to be audited, etc. Such embodiment may allow for additional observations and statistical analysis of a particular PBM's (or payer system's) adjudication methods and calculations.

If it has been determined that the spread value associated with the adjudicated claim is within the thresholds set by the tolerance parameters, then step 218 is invoked to log the transaction to be made part of a report of the audit results related to that transaction. Such a report may be consolidated with the reports of other logged transactions and/or transmitted (or made accessible) to a third party (e.g., pharmacy, PBM, payer system, etc.).

If it has been determined that the spread value associated with the adjudicated claim is not within the thresholds set by the tolerance parameters (i.e., an unacceptable discrepancy or difference), then step 214 is invoked to store or (log) the adjudicated claim and provide the adjudicated claim information to be part of an exceptions report to be provided (or made accessible) to the PBM (or specific payer system) responsible for adjudicating that particular reimbursement claim. Such exceptions report allows the PBM to explain any discrepancies between the actual spread charged and the expected spread calculated by the spread auditing module. Exception reporting is discussed in greater detail below with reference to FIG. 3.

Step 216 may also be invoked to calculate the actual discrepancy between the amount paid and the amount due and such discrepancy along with the logged transaction may be reported in step 218, which is discussed above.

For the purposes of providing example of the detection and auditing of spread discrepancies, the following example is provided which ignores transaction costs and other charges associated with the reimbursement claim adjudication for simplicity. An adjudicated claim for drug A is received and stored at the host server and its reimbursed value is $55. The AWP corresponding to the drug is retrieved and is detected to be $100 and, according to the retrieved policy data, the payer is contractually obligated to reimburse 50% of the drug cost, or $50. Therefore, ignoring other expenses and/or charges for simplicity, the additional $5 is determined to be the PBM's spread charge that was paid by the payer system the PBM represents. At this point the contractual obligation between the payer system and the PBM for the relevant transaction type is access and the contractual spread rate is calculated. If the calculated spread is $4.97 and the tolerance parameter is set to ignore discrepancies of +/−$0.05, the transaction is not flagged. However if the calculated spread is $4, and the tolerance parameter is set to ignore discrepancies of +/−$0.05, the difference between the actual and calculated spread value is too great. In that situation, that transaction is flagged for reporting to the adjudicating PBM (or specific payer system or both) for explanation as to the discrepancy or correction of the discrepancy.

The auditing process described above may be conducted in batch mode to evaluate multiple transactions at once and provide a report summarizing all of the transaction in the batch. In an example embodiment of the invention, a batch mode implementation of the spread auditing process may be conducted on one or more adjudicated claims retrospectively. Such a batch mode implementation may be set to operate only when requested or may be done on a periodic basis. In other embodiments of the invention, the spread auditing of an adjudicated claim may occur in real-time or near real-time implementation following receipt of an adjudicated claim from the PBM.

Figure 3:
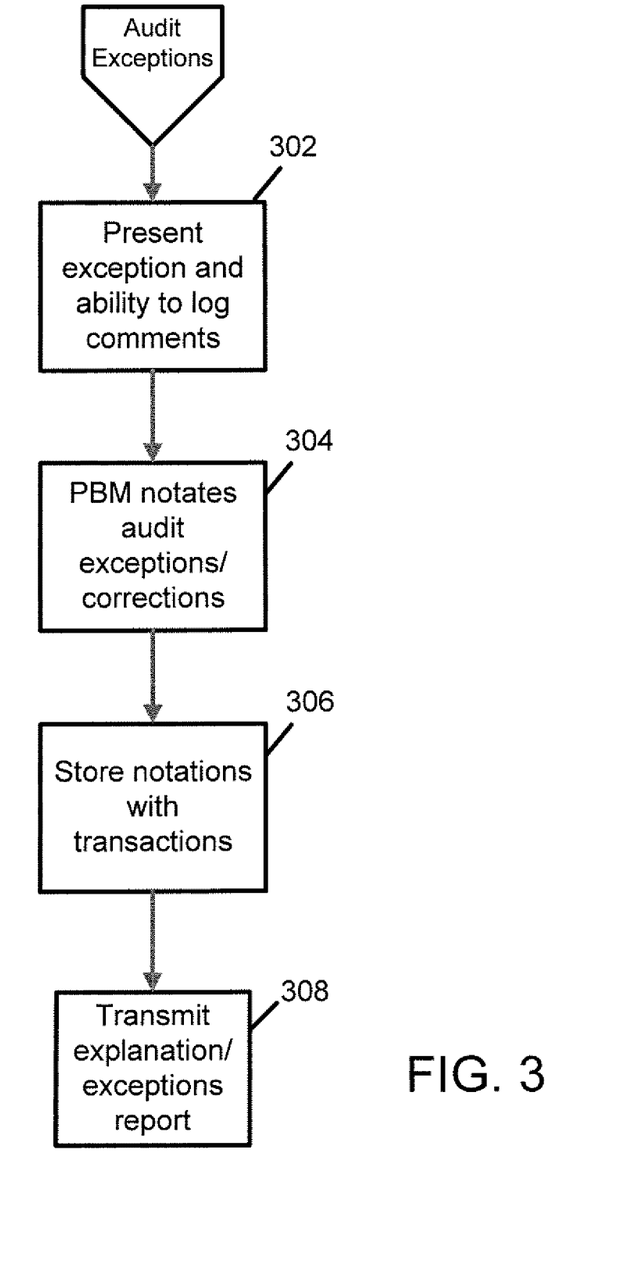
FIG. 3 shows a block diagram flowchart showing the process of providing explanation to exceptions to the expected audit values in accordance with an example embodiment of the invention.

FIG. 3 shows a block diagram flowchart showing the process of providing comment or explanation of exceptions to the expected audit values in accordance with an example embodiment of the invention. In an example embodiment of the invention, the PBM (or specific payer system) has the ability to provide comments or explanations for the discrepancy such as an exception(s) to the contracted rates detected by the spread auditing module. In an example embodiment of the invention, the explanations may be entered through a graphical user interface online via a web browser and hosted by the host server or other data center.

As shown in FIG. 3, the exception reporting process begins at step 302 where an adjudicated claim that had been previously flagged as not being reimbursed according to the contracted obligations is presented, via an online user interface, to a representative of the PBM (or specific payer system) that adjudicated the claim. Next step 304 is invoked, where the representative of the PBM (or specific payer system) has the ability to enter comments on the transaction through the user interface to provide an explanation relating to the adjudicated claim. For example, an explanation may include noting a contractual obligation unaccounted for in the auditing system or some other explanation relating to the detected spread calculation discrepancy. Other comments that may be logged by the representative may include the corrective measures to be taken to fulfill the necessary contractual obligations of the PBM (or payer system) with regard to the flagged claim and/or other relevant information relating to the adjudicated claim or the contractual obligations of the PBM (or payer system). Explanations of flagged transactions may be applied to each individual adjudicated claim or adjudicated claims in bulk. Thus, comments may be global in nature to all flagged adjudicated claims that are related in subject matter, error detected, or in some other way that results in the representative providing the same or similar explanation to those adjudicated claims. In alternative embodiments of the invention, the comments/explanations may be automated and provided by an automated response system, which determines the category of the detected discrepancy and determines the appropriate response which may be retrieved from a database or automatically generated, depending on the complexity of the necessary comments/explanation indicated for inclusion.

For example, one comment/explanation that may occur is that the PBM calculated the reimbursement using a different AWP value. This may be because the PBM's internal AWP pricing updates at a different rate than the auditing service. In such situations, the PBM may explain how it will (or will not) correct the reimbursement depending on its particular contractual obligations.

Once the representative (or automated software program) completes entering (or selecting) the relevant comments and making the necessary notations relating to the flagged adjudicated claim, those comments/notations are stored in a database. In the example embodiment of the invention shown in FIG. 3, in step 306, the comments/notations are stored with (or otherwise associated with) the transaction data (e.g., adjudicated claim data, spread auditing result data, etc.) for future reference and association. Finally, step 308 is invoked where the comments/notations explaining the nature of the flagged transactions and/or any corrective measures to be taken may be placed in a report to be transmitted to or accessed by the party requesting the audit information (e.g., pharmacy, PBM, payer system, host server provider, etc.)

Accordingly, many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of this application. Although specific terms are employed herein, they are used in a generic and descriptive sense only and not for purposes of limitation.

That which is claimed:

1. A method of electronically auditing reimbursed prescription claims comprising:
    receiving, by a host server computer, an adjudicated claim, wherein the adjudicated claim was previously adjudicated by a payer system in response to a claim that was received by the host server computer from a pharmacy and delivered to the payer system for adjudication;
    determining, by a host server computer, an actual spread percentage fee charged by the payer system in excess of a cost reimbursed by the payer system in connection with the adjudicated claim, wherein the actual spread percentage fee is a percentage charged in excess of a cost reimbursed in connection with the adjudicated claim;
    determining, by a host server computer, an expected spread percentage fee associated with the adjudicated claim, wherein the expected spread percentage fee is an expected percentage fee in excess of the cost reimbursed based on contractual obligations of the payer system;
    comparing, by a host server computer, the actual spread percentage fee to the expected spread percentage fee to determine a difference value;
    detecting, by a host server computer, that the difference value is unacceptable based on a comparison of the difference value to at least one tolerance parameter; and
    storing, by a host server computer when the difference value is determined unacceptable, the difference value.

2. The method of claim 1, further comprising:
    receiving at least one exception comment from the payer system relating to the difference value;
    attaching the at least one exception comment to a message, wherein the message contains information relating to the adjudicated claim and the difference value; and
    transmitting the message.

3. The method of claim 1, wherein receiving an adjudicated claim includes retrieving an adjudicated claim from a spread evaluation table in a database.

4. The method of claim 1, wherein determining an actual spread percentage charged by the payer system includes utilizing a current Average Wholesale Price (AWP) value of at least one drug associated with the adjudicated transaction.

5. The method of claim 1, wherein the payer system comprises a pharmacy benefit management system (PBM).

6. The method of claim 1, further comprising, prior to comparing the actual spread percentage to the expected spread percentage, adjusting the at least one tolerance parameter.

7. The method of claim 1, wherein determining an expected spread percentage associated with the adjudicated claim includes retrieving the expected spread percentage associated with the adjudicated claim from a database.

8. The method of claim 1, wherein determining an expected spread percentage associated with the adjudicated claim includes determining an expected spread percentage associated with the adjudicated claim utilizing policy data associated with the adjudicated claim.

9. The method of claim 1, further comprising calculating a monetary value associated with the difference value, wherein the monetary value reflects the discrepancy between the actual spread percentage and the expected spread percentage; and storing the monetary value.

10. A method of electronically auditing reimbursed prescription claims comprising:

receiving, by a host computer, an adjudicated claim, wherein the adjudicated claim was previously adjudicated by a payer system in response to a claim that was received by the host server computer from a pharmacy and delivered to the payer system for adjudication;

extracting, by a host computer, a cost associated with the adjudicated claim from the adjudicated claim;

extracting, by a host computer, prescription information from the adjudicated claim;

determining, by a host computer from the cost associated with the adjudicated claim and the prescription information, an actual spread value charged by the payer system in excess of a cost reimbursed by the payer system in connection with the adjudicated claim, wherein the actual spread percentage is a percentage charged in excess of the cost associated with the adjudicated claim;

determining, by a host computer, an expected spread value associated with the adjudicated claim utilizing policy data associated with the adjudicated claim, wherein the expected spread value is a charge in excess of the cost reimbursed;

comparing, by a host computer, the actual spread percentage to the expected spread percentage to determine a difference value;

detecting, by a host computer, that the difference value is unacceptable based on a comparison of the difference value to at least one tolerance parameter; and storing, by a host computer when the difference value is determined unacceptable, the difference value.

11. The method of claim 10, further comprising:

receiving at least one exception comment from the payer system relating to the difference value;

attaching the at least one exception comment to a message, wherein the message contains information relating to the adjudicated claim and the difference value; and transmitting the message.

12. The method of claim 10, wherein extracting prescription information from the adjudicated claim includes extracting at least one of a drug name, a quantity, and a date a prescription was filled.

13. The method of claim 10, wherein determining an expected spread value associated with the adjudicated claim utilizing the policy data includes determining the expected spread value utilizing the policy data and the adjudicated claim.

14. The method of claim 10, wherein determining an expected spread value associated with the adjudicated claim includes retrieving the expected spread value associated with the adjudicated claim from a database.

15. The method of claim 10, further comprising, prior to comparing the actual spread value to the expected spread value, adjusting the at least one tolerance parameter.

16. A system for auditing reimbursed claims comprising:

at least one database, wherein the at least one database contains at least one auditing file; and a host server wherein the host server is in communication with the at least one database, and wherein the host server contains a processor that executes software instructions to:

receive an adjudicated claim, wherein the adjudicated claim was previously adjudicated by a payer system in response to a claim that was received by the host server computer from a pharmacy and delivered to the payer system for adjudication, determine an actual spread percentage charged by the payer system, wherein the actual spread percentage is a percentage charged in excess of a cost reimbursed in connection with the adjudicated claim;

determine an expected spread percentage associated with the adjudicated claim, wherein the expected spread percentage is an expected percentage based on contractual obligations of the payer system;

compare the actual spread percentage to the expected spread percentage to determine a difference value;

detect that the difference value is unacceptable based on a comparison of the difference value to at least one tolerance parameter; and store the difference value when the difference value is determined unacceptable.

17. The system of claim 16, wherein the processor executes additional software instructions to:

receive at least one exception comment from the payer system relating to the difference value;

attach the at least one exception comment to a message, wherein the message contains information relating to the adjudicated claim and the difference value; and transmit the message.

18. The system of claim 16, wherein the payer system may be a pharmacy benefit management system (PBM).

19. The system of claim 16, wherein the software instructions executed by the processor to determine an expected spread percentage associated with the adjudicated claim include software instructions to retrieve the expected spread percentage associated with the adjudicated claim from the at least one database.

20. The system of claim 16, wherein the processor executes additional software instructions to:

receive, from a web browser, at least one adjustment request for the at least one tolerance parameters.

* * * * *